(12) United States Patent
Caro Martínez (10) Patent No.: US 11,941,192 B2
(45) Date of Patent: Mar. 26, 2024

(54) EYE-TRACKER, SYSTEM COMPRISING EYE-TRACKER AND COMPUTER DEVICE AND METHOD FOR CONNECTION BETWEEN EYE-TRACKER AND COMPUTER DEVICE

(71) Applicant: IRISBOND CROWDBONDING, S.L., Donostia-San Sebastián (ES)

(72) Inventor: Alberto Caro Martínez, Donostia-San Sebastián (ES)

(73) Assignee: IRISBOND CROWDBONDING, S.L., Donostia-San Sebastián (ES)

( * ) Notice: Subject to any disclaimer, the term of this patent is extended or adjusted under 35 U.S.C. 154(b) by 0 days.

(21) Appl. No.: 17/795,635

(22) PCT Filed: Jan. 29, 2021

(86) PCT No.: PCT/EP2021/052124
§ 371 (c)(1),
(2) Date: Jul. 27, 2022

(87) PCT Pub. No.: WO2021/152101
PCT Pub. Date: Aug. 5, 2021

(65) Prior Publication Data
US 2023/0073524 A1   Mar. 9, 2023

(30) Foreign Application Priority Data
Jan. 29, 2020 (EP) ..................................... 20382053

(51) Int. Cl.
*G06F 3/038* (2013.01)
*G06F 3/01* (2006.01)

(52) U.S. Cl.
CPC .............. *G06F 3/038* (2013.01); *G06F 3/013* (2013.01)

(58) Field of Classification Search
CPC .................................. G06F 3/038; G06F 3/013
See application file for complete search history.

(56) References Cited

U.S. PATENT DOCUMENTS

2004/0263477 A1* 12/2004 Davenport ............ G06F 3/0383
345/163
2004/0267973 A1* 12/2004 Sumida ................. G06F 9/4413
713/1

(Continued)

FOREIGN PATENT DOCUMENTS

CN        108268135 A        7/2018

OTHER PUBLICATIONS

European Office Action for European Application No. 20382053.5, dated Feb. 7, 2023, 6 pages.

(Continued)

*Primary Examiner* — Ariel A Balaoing
(74) *Attorney, Agent, or Firm* — CANTOR COLBURN LLP (57) ABSTRACT

An eye-tracker (40) comprising: an imaging system (41) configured to capture images (41_o) of a user's eyes (11, 12), said images comprising information of the user's point of gaze on a display (25, 35) of a computer device (20, 30); a processing module (42) for processing the images (41_o) captured by the imaging system (41) and providing processed data comprising structured information (42_o); a multi-platform module (43) for converting the processed data comprising structured information (42_o) into data comprising serialized structured information (43_o) in a format understandable by a plurality of operating systems; and a connection module (60) coupled to an input/output port (51) of the eye-tracker (40) for connecting the eye-tracker (40) with a computer device (20, 30). A system comprising an eye-tracker (40) connected to a computer device (20, 30). A method for connecting an eye-tracker (40) and a computer device (20, 30).

14 Claims, 4 Drawing Sheets

(56) References Cited

U.S. PATENT DOCUMENTS

| | | | | |
|---|---|---|---|---|
| 2006/0143319 | A1* | 6/2006 | Hsu | G06F 13/385 710/8 |
| 2008/0005375 | A1* | 1/2008 | Ying | G06F 13/102 710/14 |
| 2008/0147911 | A1* | 6/2008 | Hitt | G06F 16/1847 710/33 |
| 2011/0153695 | A1* | 6/2011 | Kang | G06F 16/182 709/227 |
| 2012/0133754 | A1* | 5/2012 | Lee | H04N 21/4223 348/78 |
| 2012/0303846 | A1* | 11/2012 | Li | G06F 13/4282 710/63 |
| 2013/0283208 | A1* | 10/2013 | Bychkov | G06F 3/0425 715/810 |
| 2014/0215099 | A1 | 7/2014 | Norloff et al. | |
| 2015/0085056 | A1* | 3/2015 | Van Broeck | H04N 5/2628 348/14.1 |
| 2015/0220295 | A1* | 8/2015 | Kim | G06F 3/013 345/156 |
| 2015/0309569 | A1* | 10/2015 | Kohlhoff | G06V 40/193 382/103 |
| 2016/0036772 | A1* | 2/2016 | Pratapa | H04L 61/5038 709/245 |
| 2017/0075421 | A1* | 3/2017 | Na | G06F 3/013 |
| 2018/0373373 | A1* | 12/2018 | Chae | G06F 3/14 |
| 2021/0392166 | A1* | 12/2021 | Hu | H04L 63/083 |
| 2023/0013509 | A1* | 1/2023 | Iyer | G06F 9/445 |

OTHER PUBLICATIONS

Jungwirth, "Contour-Guided Gaze Gestures: Eye-based Interaction with Everyday Objects (Master Thesis)", Nov. 1, 2017, pp. 1-81, retrieved from URL: https://epub.jku.at/obvulihs/download/pdf/2385958?originalFilename=true.

Anonymous, "Serialization—Wikipedia", Nov. 25, 2019, pp. 1-11, Retrieved from the Internet: URL:https://en.wikipedia.org/w/index.php?title=Serialization&oldid=927895895; XP055792124.

Anonymous, "Tobii Pro X3-120 Eye Tracker User's Manual—Version 1.0.9", Aug. 1, 2019, pp. 1-42, Retrieved from the Internet: URL:https://www.tobiipro.com/siteassets/tobii-pro/user-manuals/tobii-pro-x3-120-user-manual.pdf/?v=1.0.9, XP055713902.

International Search Report dated Apr. 13, 2021 re: Application No. PCT/EP2021/052124, pp. 1-5, citing: CN 108 268 135 A, Tobii "Timing Guide . . . ", US 2014/0215099 A1, Schenk et al. "GazeEverywhere . . . ", TOBII Pro X3-120 Eye Tracker User's Manual, Wikipedia—Sterilization and Hale "Eyestream: An Open WebSocket-based Middleware . . . . "

Matthew Hale, "Eyestream: An Open WebSocket-based Middleware for Serializing and Streaming Eye Tracker Event Data from Gazepoint GP3 Hd Research Hardware", Journal of Open Source Software, vol. 4, No. 43, Nov. 1, 2019, p. 1620-1625, XP055714262.

Simon Schenk et al., "GazeEverywhere: Enabling Gaze-only User Interaction on an Unmodified Desktop PC in Everyday Scenarios", Designing Gaze-based Gestures and Features, Proceedings of The 2017 CHI Conference on Human Factors in Computing Systems, CHI '17, ACM Press, May 2, 2017, p. 3034-3044, XP058337527.

Tobii, "Timing Guide for Tobii Eye Trackers and Eye Tracking Software", Feb. 23, 2010, Retrieved from the Internet: URL:https://www.tobiipro.com/siteassets/tobii-pro/learn-and-support/design/eye-tracker-timing-performance/tobii-eye-tracking-timing.pdf/?v=1.0; XP055681059.

Written Opinion dated Apr. 13, 2021 re: Application No. PCT/EP2021/052124, pp. 1-9, citing: CN 108 268 135 A, Tobii "Timing Guide . . . ", US 2014/0215099 A1, Schenk et al. "GazeEverywhere . . . ", TOBII Pro X3-120 Eye Tracker User's Manual, Wikipedia—Sterilization and Hale "Eyestream: An Open WebSocket-based Middleware . . . . "

* cited by examiner

EYE-TRACKER, SYSTEM COMPRISING EYE-TRACKER AND COMPUTER DEVICE AND METHOD FOR CONNECTION BETWEEN EYE-TRACKER AND COMPUTER DEVICE

TECHNICAL FIELD

The present invention relates to the field of tracking/detecting of eye movements, such as gaze point, in connection with interactive graphical user interfaces. More particularly, it relates to eye-trackers and to solutions for connecting an eye-tracker to a device having a display unit.

STATE OF THE ART

Techniques for enabling user interaction with a computer element, such as a computer display, using eye gaze tracking, are well-known. Controlling a computer display through eye gaze tracking usually replaces or complements mouse inputs and/or keypad inputs. Thus, the cursor is positioned on the display according to a calculated point of gaze of the user. Techniques for selecting and activating a target object in a display include activating an object upon detection that the subject fixates his/her eyes at the object for a certain period of time, activating an object when the subject's eye blinks, or others.

Currently, eye-trackers usually connect to the computer to be controlled through a wired connection, in particular a USB device. The USB device thus becomes the power source for the eye-tracker, which receives power from the computer to be controlled. In addition, the eye-tracker sends through the USB device information for the cursor coordinates movement and position to the computer to be controlled.

One of the main drawbacks of current eye-trackers is that, in order to control a computer device having a display unit, specific software dependent on the operating system (OS) of the computer device to be controlled, needs to be installed in the computer device. This software, generally referred to as eye-tracking software, may include a set of computer programs for mouse control applications, for calibration of gaze point, and others. Developing specific software for computer devices having different operating systems hinders the possibility of deploying eye-trackers in groups that may undoubtedly benefit from them, such as handicapped persons, and also makes it difficult to develop and install upgrades to this software. In other words, using OS-dependent software may decrease the user's motivation to use the computer device, which might have a negative impact on his/her routine activities.

In addition, conventional eye-trackers cannot operate with any computer device having a screen. This is due to the type of eye-gaze data processing performed by conventional eye-trackers. Conventional eye-trackers usually deliver eye-gaze data to the computer device on whose display the cursor is controlled through the eye-gaze data, in a fashion that requires further processing by the computer device. In other words, in order to be capable of operating with a conventional eye-tracker, computer devices require certain minimum processing capabilities, without which the eye-gaze data delivered by the eye-tracker cannot be processed. However, performing the calculation of the final gaze point outside the eye-tracker may cause a drop in performance on the device actually performing the calculation.

This may result in sub-optimal user experience and sub-optimal computing process due to possible computing limitations of the device performing the calculation. In practice, this implies that the eye-tracker cannot connect to any device unless this has certain minimum computing capability.

For example, current eye-trackers collect images with certain quality and properties and send them to a computer device under control, which may require a Microsoft Windows OS v7, v8 or v10. This computer device needs to have installed both the drivers belonging to the camera carried by the eye-tracker and the software in charge of analyzing the images obtained from the eye-tracker. Only under these circumstances can the process of transforming images into the final gaze-points be carried out, and the final gaze-points will then be passed on to the Windows OS so that the mouse can be moved.

However, certain computing devices, such as smart TVs or tablets, are not designed to have large computing capacity. Rather, they are more oriented to mobility or energy saving, for example. In short, they are designed to perform tasks common to average users, that do not require large calculation processes, such as displaying images, video, browsing the Internet, etc. To perform these tasks, they are designed with tight calculation capacity, which makes them cheaper and not much energy consuming, thus providing, for example in the case of tablets, greater autonomy to the batteries.

Therefore, there is a need to develop an eye-tracker and a system and method for simplifying the communication between an eye-tracker and a computer device.

DESCRIPTION OF THE INVENTION

The eye-tracker and system and method for connecting an eye-tracker to a computer device described in the present invention intend to solve the shortcomings of conventional eye-trackers, systems and methods therefor.

A first aspect of the invention relates to an eye-tracker comprising: an imaging system configured to capture images of a user's eyes, said images comprising information of the user's point of gaze on a display of a computer device; a processing module for processing the images captured by the imaging system and providing processed data comprising structured information; a multi-platform module for converting the processed data comprising structured information into data comprising serialized structured information in a format understandable by a plurality of operating systems; and a connection module coupled to an input/output port of the eye-tracker for connecting the eye-tracker with a computer device.

In embodiments of the invention, the structured information comprises at least the following information: gaze points; eyes position on the image; and distance between user and eye-tracker.

In embodiments of the invention, the connection module is a USB module coupled to a USB input/output port for connecting the eye-tracker with a computer device through a USB interface.

In embodiments of the invention, the connection module is designed to implement at least one configuration, said at least one configuration implementing a local area network (LAN) over USB interface. The at least one configuration preferably permits to establish different types of communication between the eye-tracker and the computer device for enabling the following: sending video signals to the computer device; mouse control by sending the position or coordinates of the mouse cursor on the display; calibration of the eye-tracker; power charging of the eye-tracker; software upgrades in the computer device; or collecting from the computer device and sending to the eye-tracker statistics of use of the eye-tracker.

In embodiments of the invention, the at least one configuration is a configuration further implementing a HID USB mouse interface.

In embodiments of the invention, the local area network (LAN) over USB interface is an Ethernet USB network interface. This interface is preferably an ECM (Ethernet control model) interface or a RNDIS (Remote Network Driver Interface Specification) interface.

In embodiments of the invention, a system is provided, comprising an eye-tracker according to the first aspect of the invention, and a computer device connected to the eye-tracker through a USB interface, wherein a cursor on the display of the computer device is controllable from a point of gaze of a user on the display obtained by the eye-tracker.

In embodiments of the invention, the computer device is selected from a group of computer devices comprising: a personal computer, a laptop, a tablet, a smartphone and a smart TV.

In embodiments of the invention, the computer device implements an operating system selected from a group of operating systems comprising: Windows, iOS, IpadOS, Android and GNU/Linux.

In embodiments of the invention, the computer device has an embedded software application configured to interpret the serialized structured information provided by the eye-tracker.

A second aspect of the invention relates to a method for communication between an eye-tracker and a computer device, wherein the eye-tracker comprises an imaging system configured to capture images of a user's eyes, said images comprising information of the user's point of gaze on a display of the computer device; a processing module for processing the images captured by the imaging system and providing processed data comprising structured information; a multi-platform module for converting the processed data comprising structured information into data comprising serialized structured information in a format understandable by a plurality of operating systems; and a connection module coupled to an input/output port for connecting the eye-tracker with the computer device. The method comprises; reading at a USB host of the computer device configuration information of the USB module, said configuration information comprising information of at least one configuration, said at least one configuration implementing a local area network (LAN) over USB interface; starting a communication following the USB protocol between said USB host and said USB module.

A third aspect of the invention relates to a computer program product comprising computer program instructions/code for performing the method of the second aspect of the invention.

A fourth aspect of the invention relates to a computer-readable memory/medium that stores program instructions/code for performing the method of the second aspect of the invention.

Additional advantages and features of the invention will become apparent from the detailed description that follows and will be particularly pointed out in the appended claims.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DESCRIPTION OF A WAY OF CARRYING OUT THE INVENTION

Figure 1A:
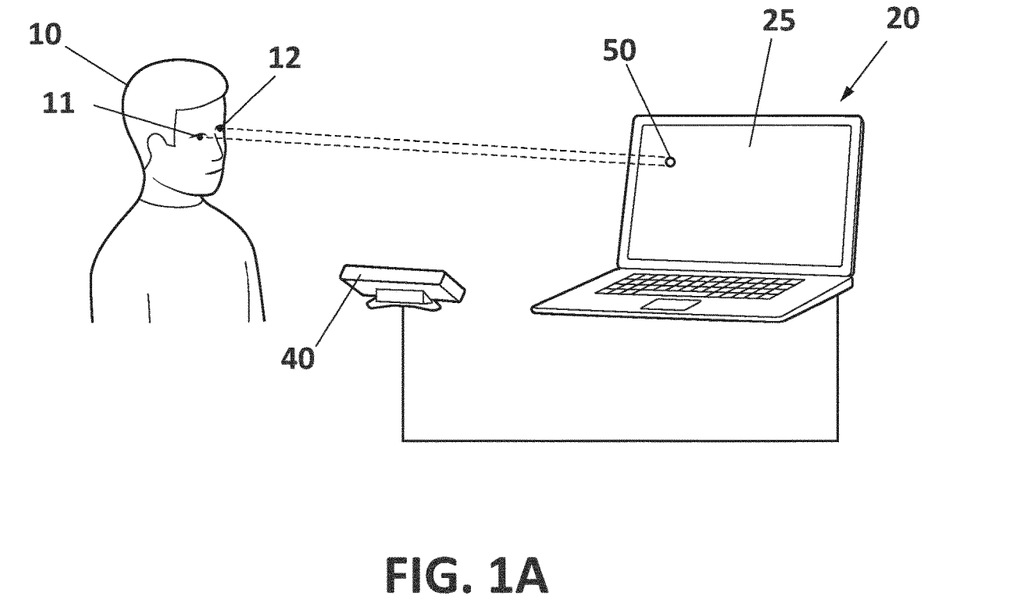
FIGS. 1A-1B show respective schematic pictures of an eye-tracking system according to embodiments of the invention.
Figure 1B:
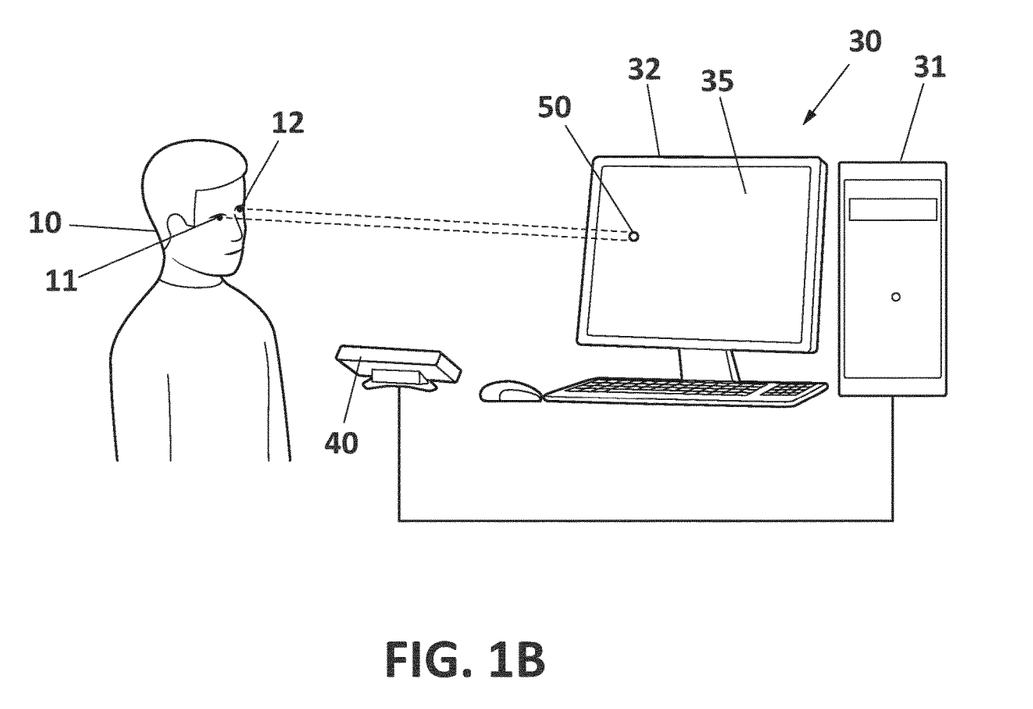

FIG. 1A schematically shows a user 10 seated or standing in front of a computer device or host computer—in this case a laptop 20—equipped with a screen or display 25. Similarly, FIG. 1B schematically shows a user 10 seated or standing in front of a computer device or host computer—in this case a personal computer 30—equipped with a computer monitor 32 in turn having a screen or display 35. Alternatively, the computer device may be a different electronic device equipped with a display, such as a tablet, a mobile phone, such as a smart phone, or a smart TV, among others. The computer device 20, 30 includes processing means, which in the second embodiment is included in block 31. In the laptop 20, processing means is embedded within the laptop itself. The same applies when the computer device is for example a tablet or a mobile phone. Connected to the computer device 20, 30, there is an eye-tracker 40 for controlling the display 25, 35 of the computer device 20 with the eyes 11, 12 of the user 10. Eye gaze tracking may replace or at least complement mouse inputs and/or other human interface inputs, such as keypad inputs.

Thus, by using the eye-tracker 40, the cursor, such as mouse cursor, may be positioned on the point (coordinates) 50 of the display 25, 35 according to a calculated point of gaze of the user. In other words, the cursor is controllable in response to data and/or commands originated by the eye-tracker 40. Non-limiting examples of such data are the coordinates of the gaze point that may be sent from the eye-tracker to a program being executed by the computer device 20, 30. In this case, the program being executed moves the cursor according to the coordinates of the gaze point. Non-limiting examples of such commands are mouse movement commands that may be sent to the computer device 20, 30 (for example, to an IPad) through the literal mouse movement, understanding as mouse a mouse emulation performed according to embodiments of the invention (described in detail later). This cursor movement is done by means of the mouse of the computer device.

The eye-tracker 40 typically includes an imaging device (not illustrated in FIGS. 1A-1B) comprising a camera and one or more light sources (not illustrated in FIGS. 1A-1B) for illuminating the user's eyes 11, 12. For example, each light source may comprise a plurality of infrared LEDs that generate a reflection, also referred to as a glint, when the infrared light comes in contact with the cornea and pupil of an eye. This generates a reference frame of the eye. This configuration is called "dark-pupil" mode. The camera captures the image of the eyes 11, 12 and sends it to processing means comprised in the eye-tracker 40, where a software program detects, for each eye, the position of the pupils and the two glints. These three points (center of the pupil and two glints) are used to extract a 2D vector. Since the relative position between the pupil and the glints changes depending on the direction of the user's gaze, by analyzing the geometric arrangement of these elements it is possible to estimate the point 50 on the display 25, 35 at which the user 10 is looking. Other configurations, such as "light-pupil" mode or combinations of "dark-pupil" and "light-pupil" modes, may be used instead. Different algorithms may be used for estimating the gaze point 50. In any case, the eye-tracker 40 is adapted to repeatedly determine the user's 10 point of regard 50 on the display 25, 35. To this end, the eye-tracker 40 comprises processing means, such as a processing module, adapted to receive and process data captured by the imaging device. The optics and electronics involved in the capture of image eyes for the estimation of gaze points are out of the scope of the present invention.

Every-time the eye-tracker 40 determines the user's 10 point of regard 50 on the display 25, 35 of the computer device 20, 30, the eye-tracker 40 sends eye-gaze data to the computer device 20, 30. With this information, the computer device 20, 30 adjusts the coordinates (for example x, y position) of the cursor on the display 25, 35. The computer device 20, 30 may enter control commands in response to movement sequences of the point of regard 50 over the display 25, 35. The eye-tracker 40 may communicate with the computer device 20, 30 through a wired interface, such as a wired Universal Serial Bus (USB) interface. Alternatively, eye tracker 40 and computer device 20, 30 may communicate through a wireless interface, for example using a wireless protocol, such as WiFi or Bluetooth, over a USB port. A block diagram of the eye-tracker 40 and a computer device 20, 30 is schematized in FIG. 2. As can be observed, communication between eye-tracker 40 and computer device 20, 30 occurs through an interface, which is preferably a USB interface. To this purpose, both the eye-tracker 40 and the computer device 20, 30 are equipped with respective ports 51, 52, preferably USB ports.

Figure 2:
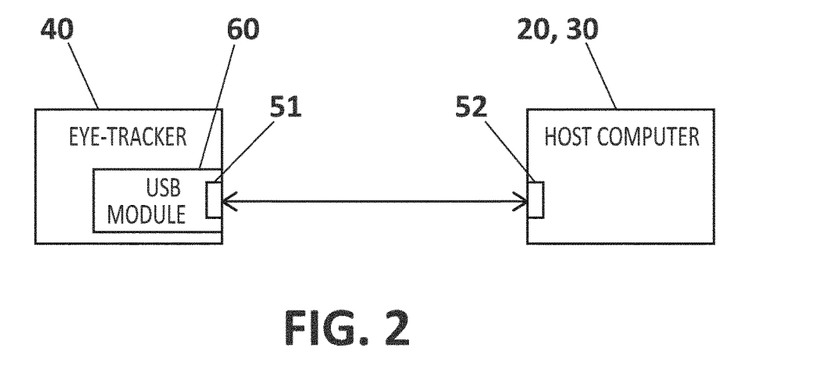
FIG. 2 shows a block diagram of the elements involved in the system of the present invention: an eye-tracker and a computer device.

In particular, communication is established between a module in the eye-tracker 40 and a module in the computer device 20, 30. More in particular, this communication may be established through a local area network (LAN) created through a USB connection established between both modules. In this USB connection, the eye-tracker 40 acts as USB device (through USB module 60), and the computer device 20, 30, acts as USB host. USB host in the computer device 20, 30 may be a module compatible with the USB module 60 of the eye-tracker 40. Through the USB interface or USB connection, the eye-tracker 40 receives power supply from the computer device 20, 30. In addition, through the USB interface or USB connection, the eye-tracker 40 sends the computer device 20, 30 the eye-tracking data extracted from the processing of the pictures captured by the imaging device of the eye-tracker 40. Eye-tracking data may comprise information for the cursor coordinates movement and position on the display 25, 35. The computer device 20, 30 may use this information to adjust the cursor position on the display and/or to extract control commands.

Figure 3:
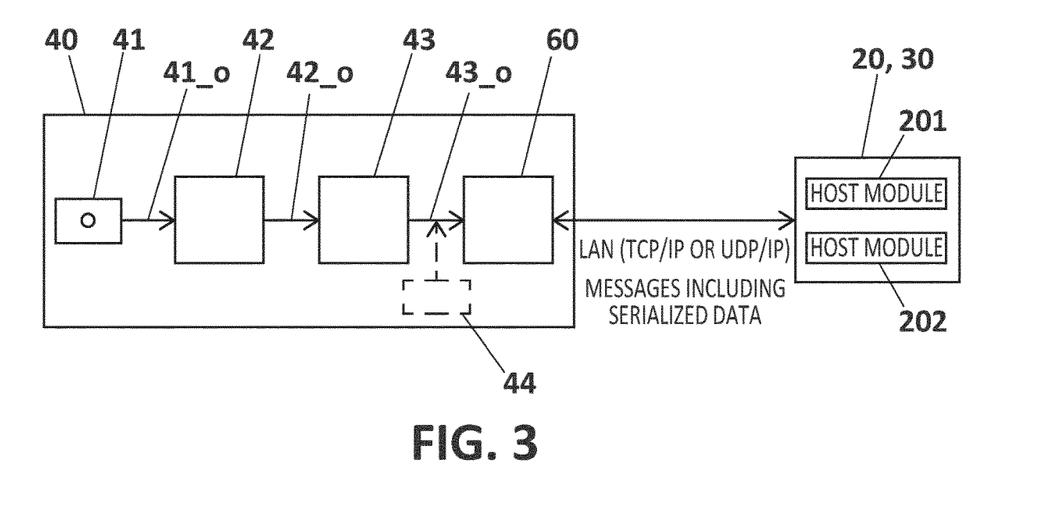
FIG. 3 shows a block diagram of an eye-tracker according to an embodiment of the invention.

FIG. 3 shows a block diagram of an eye-tracker 40, including modules representing relevant capabilities and functionalities of the eye-tracker according to embodiments of the invention. Block or module 41 represents an imaging system or a portion thereof. Module 41 comprises a camera configured to capture images of the user's eyes 11, 12 following the general operation of an eye-tracker. Data captured by module 41 is delivered to block or module 42. Such delivered data 41_o are the images captured by module 41.

Block or module 42 comprises processing means for processing the data 41_o delivered by block 41. Processing means may be embodied, for example, in the form of a microcontroller, a microprocessor or a FPGA. Unlike conventional eye-trackers, which send raw data captured by imaging systems to the computer device under control, and therefore imposes on the computer device under control advanced processing capabilities for processing the raw data, in the present eye-tracker 40, module 42 performs complete processing of the captured data, therefore releasing the computer device 20, 30 under control from performing complicated processing tasks. Once it has received an image 41_o from module 41 (for example from its camera), module 42 processes the image 41_o and obtains information therefrom. This information is information (data) to be shared with the computer device 20, 30. This data 42_o comprises at least one of the following information: gaze points, such as raw gaze points or filtered gaze points; eyes position on the image; image size; and distance between user and eye-tracker. Filtered gaze points refer to gaze points to which a mathematical function has been applied in order to prevent wrong cursor positions or wrong cursor coordinates derived from an incorrect input. Gaze points may be optionally filtered. In a preferred embodiment, data 42_o comprises at least the following information: gaze point; eyes position on the image; and distance between user and eye-tracker. It optionally comprises the image size. Gaze points may be raw or filtered. So, module 42 provides processed data 42_o to module or block 43, wherein processed data 42_o is or comprises at least one of the enumerated structured information.

Due to the processing performed in block 42, the eye-tracker 40 is a multi-device eye-tracker, meaning that it is capable of communicating with any computer device 20, 30, such as personal computer, laptop, tablet, smartphone, smart TV, or others, regardless of the processing capacity of the computer device.

Module 42 provides processed data 42_o to module or block 43. Module 43 establishes a common language for a plurality of operating systems (OS) implemented in the computer device 20, 30. This language understandable by different operating systems makes the eye-tracker 40 be multi-platform (also referred to as multi-operating system). Non-limiting examples of operating systems that understand the language of the eye-tracker 40 are Windows, iOS, IpadOS, Android, GNU/Linux, among others.

So, processed data 42_o (structured information of interest for the computer device 20, 30) is provided to module 43, which converts the data comprised in said structured information into a language common to any application running in any type of computing device 20, 30. This is a process of serializing structured information. In other words, it translates the structured data 42_o into serialized structured information. This is performed by means of a mechanism or tool, referred to in FIG. 3 as 44, providing language-neutral, platform-neutral serialized structured data. This may be obtained using a generated source code for writing and reading the original structured data. Such code may be written, for example, in Java, Python, Objective-C, C++, or other languages. In a particular embodiment, this is performed by means of a Google tool called Protobuf. In other words, module 43 collects information 42_o and transforms it with the help of tool 44, into something—serialized data 43_o—that later will be correctly interpreted by final applications running in any computer device 20, 30.

Now, at the output of module 43, information (serialized data 43_o) is ready to be sent to the computer device 20, 30 through module 60. Module 60 is configured to, inter alia, create a local area network (LAN) by means of, for example, an USB Ethernet gadget not yet described. Thus, information 43_o (serialized data) can be sent from module 60 through protocols such as IP and TCP or UDP, to the computer device 20, 30. Preferably, TCP/IP is used for sending information associated to calibration, while UDP/IP is used for sending normal-use information (such as raw gaze points; filtered gaze points; eyes position on the image; image size; and distance between user and eye-tracker).

Module 43 delivers serialized data 43_o. Data 43_o represents the processed eye-gaze data in a format understandable by the operating system running in computer device 20, 30. In order for the OS of the computer device 20, 30 to understand the serialized data 43_o provided by module 42, an application (APP) embedded in processing means in the computer device 20, 30 understands and interprets this data 43_o. This application may be uploaded in the computer device 20, 30 for example from the internet. Alternatively, it may be uploaded the first time the eye-tracker 40 is connected to the computer device 20, 30. Due to the transformation performed in block 43, the eye-tracker 40 is a multi-platform eye-tracker, meaning that it is capable of communicating with any OS implemented in the computer device 20, 30.

Information of interest to the computer device 20, 30, once it has been transmitted through the LAN using for example protocols such as TCP/IP or UDP/IP, as schematically depicted in FIG. 3, is received by modules or programs (host modules 201, 202) located in the computer device 20, 30. The computer device 20, 30, which can be a Smartphone—including but not limiting an Android-based phone or an Iphone-, a tablet having Windows as OS, a computer having GNU/Linux as OS, an Ipad having IpadOS, or any combination having any operating system, for example one of the following operating systems: IpadOS, Android, GNU/Linux or Windows, de-serializes the received information (serialized data). In other words, it transforms the received information, which includes serialized data in a language common to all operating systems, by means of proprietary mechanisms of the operating system running in the computer device 20, 30, into a language exclusive to the operating system of the computer device 20, 30. This way, the computer device 20, 30 can now execute the received information or operate according to the received information/command.

In order to de-serialize the information, large computing capacity is not required. As a consequence, this requires hardly any calculation time (processing time) or energy consumption. It simply requires interpreting the message—having encapsulated serialized data—received and executing the action indicated in the data, for example using the APIS provided by the operating systems. Thanks to this, the eye-tracker 40 can be connected to any computer device 20, 30 that has a minimum computing power (processing power) without reducing its performance. An example of action indicated in the encapsulated data is, in the particular case of the computer device being an Ipad running IpadOS, the emulation of a mouse: a mouse has been designed that can be emulated from the eye-tracker. This way, the mouse cursor in the Ipad is moved (controlled) directly from the eye-tracker, just as if a real mouse was connected to the computer device (Ipad).

On the other hand, the calibration mechanism between eye-tracker and computer device does not differ from the mechanism for sending the gaze point and other information described above, in terms of the stages and modules involved. The difference lies in the fact that it is preferably carried out by means of TCP/IP, instead of UDP/IP, and that certain order and particular synchronization mechanisms are required between module 42 in the eye-tracker and the computer device 20, 30, that is to say, between the module in charge of collecting and processing information and the computer device 20, 30. This calibration mechanism is common to all operating systems.

So, the eye-tracker 40 also has a block or module 60 coupled to a physical input/output port 51 (as shown for example in FIG. 2) through which the eye-tracker 40 can communicate with a computer device 20, 30. In particular, module 60 communicates with a host module 201, 202 embedded or comprised in the computer device 20, 30. Two host modules 201, 202 are exemplified in FIG. 4. The host module 201, 202 acts as master and module 60 acts as slave. Block 60 represents a module capable of performing a configuration (explained next). Thanks to this module 60, the eye-tracker 40 can be or act as different devices, which behave as slave devices with respect to the host (computer device 20, 30).

As shown in FIG. 3, the output delivered by module 60 is derived from the communication generated by means of the local area network (LAN) created between eye-tracker 40 and host module of computer device 20, 30. This communication may be done via a USB Ethernet network generated by the Network functions of the configuration used by module 60 to generate an Ethernet LAN connection. In short, information is usually sent using an IP connection using the generated network (LAN), except when a mouse is emulated (IPadOS) as already indicated.

Module 60 is also referred to as a multi-gadget module. It is preferably a USB module, also referred to as multi-gadget USB module. Module 60 is configured to emulate one or more configurations depending on the required communication with the computer device 20, 30. This relates therefore with the capability of the eye-tracker to be multi-device and multi-platform: because the eye-tracker 40 is capable of operating with very different computer devices, such as personal computers, laptops, smart phones, smart TVs, tablets, etc., and with computer devices having different operating systems, the eye-tracker 40 also needs versatility and flexibility in order to operate under different configurations derived from the variety of types of computer devices and platforms used by the computer devices. This is in part enabled by module 60, which permits establishing different types of communication for emulating the following: sending video signals to the computer device 20, 30; mouse control by sending the position or coordinates of the mouse cursor on the display; calibration of the eye-tracker; power charging of the eye-tracker; software upgrades in the computer device; collecting from the computer device and sending to the eye-tracker statistics of use of the eye-tracker. Therefore, the eye-tracker 40 is a multi-platform, multi-device eye-tracker, and is capable of exchanging a vast variety of information with the computer device 20, 30 due to its multi-gadget capability.

Next, different implementations of multi-gadget module 60 are explained. Module 60 is implemented as a USB module, configured to communicate with a USB host implemented in the computer device 20, 30 with which the eye-tracker communicates. The USB module 60 enhances the capabilities or functionalities of the USB interface between the eye-tracker 40 and the host computer 20, 30 in order to further use the USB interface for additional services or applications. In particular, the USB connection between the eye-tracker and computer device may be used, in addition to sending eye-tracking data such as mouse cursor information (coordinates on the display) to the computer device 20, 30, for sending video signals to the computer device 20, 30; for calibration of the eye-tracker; for power charging of the eye-tracker; for sending software upgrades in the computer device, including downloading software programs or applications; and for collecting from the computer device and sending to the eye-tracker statistics of use of the eye-tracker. This is enabled thanks to an enhanced USB module 60, which may implement among others a LAN interface, such as an Ethernet network interface for establishing an Ethernet communication between the eye-tracker 40 and the computer device 20, 30. Alternatively, an interface for establishing a serial communication channel may be used. The USB module 60 may additionally implement an interface for emulating a human device interface, such as a mouse interface.

Figure 4A:
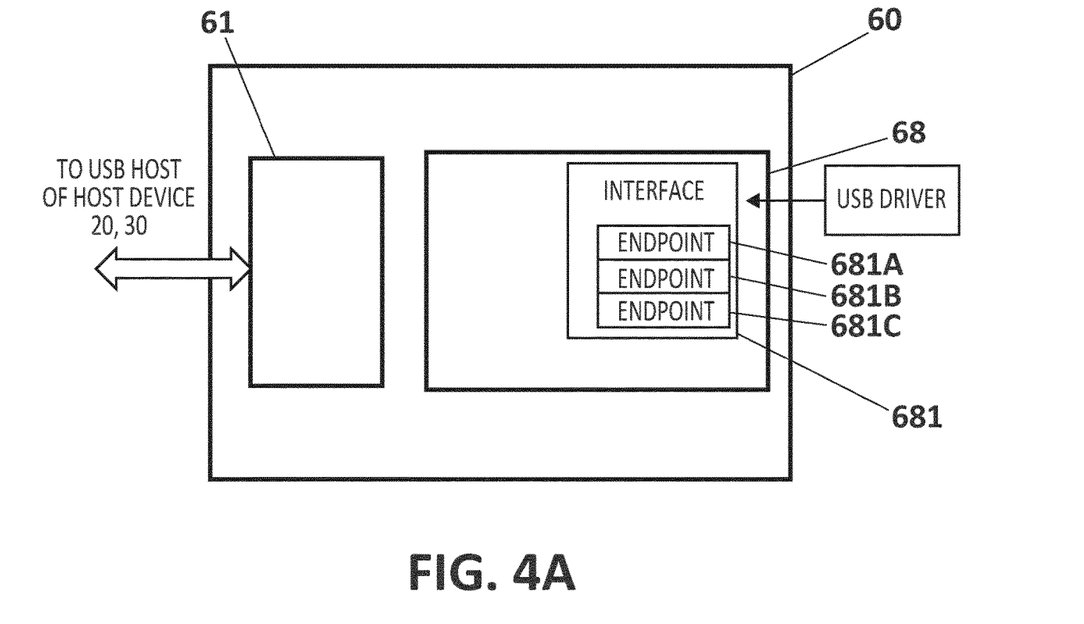
FIGS. 4A-4C show schematic representations of a USB module comprised in an eye-tracker, according to embodiments of the invention.
Figure 4B:
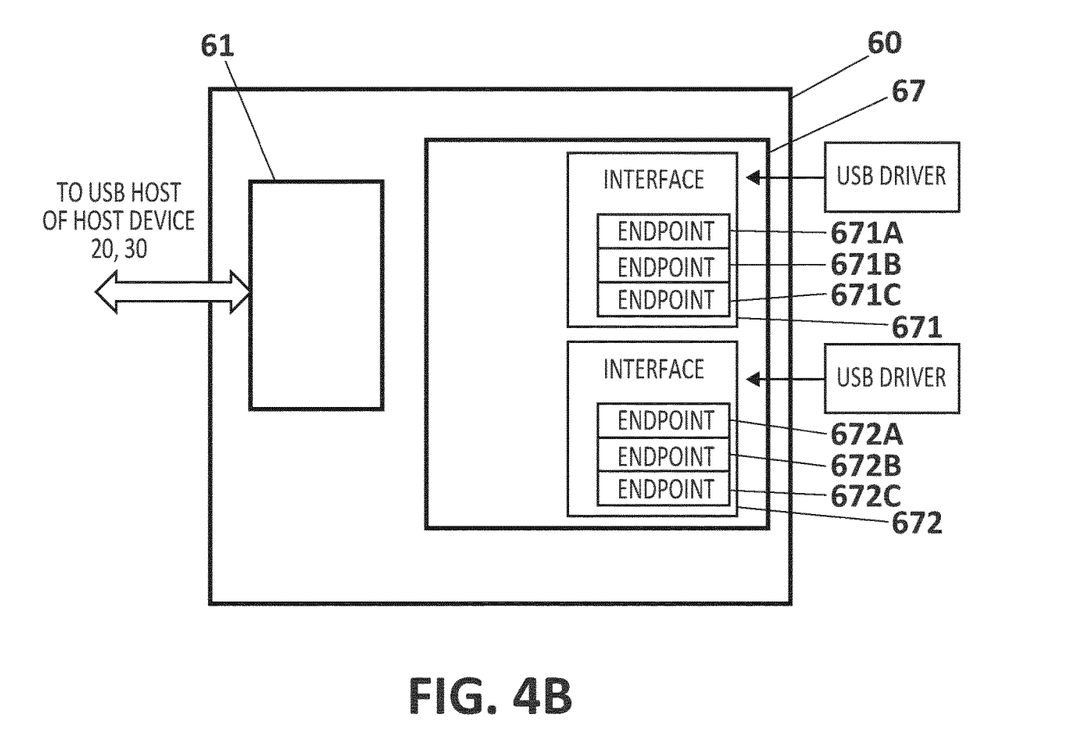
Figure 4C:
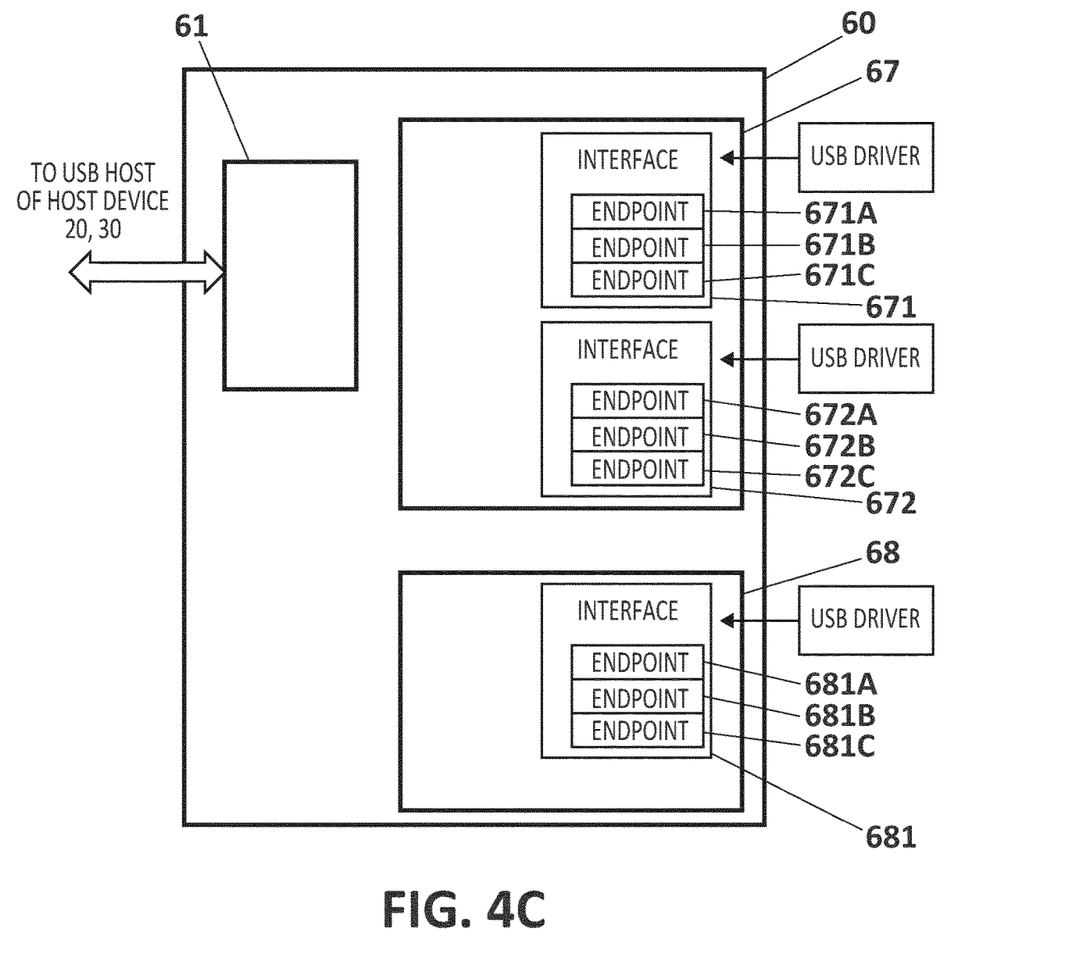

FIG. 4C shows a schematic representation of a USB module 60 comprised in an eye-tracker 40 according to an embodiment of the invention. The USB module 60 is configured for physical connection through port 51 in the eye-tracker 40, with a USB host of the computer device 20, 30, through a standard USB port/plug 52. Once the eye-tracker and the computer device are connected and a communication between them has been established, the computer device acts as master and the eye-tracker acts as slave. For example, ports/plugs 51, 52 may implement a Standard-A connector (Type-A connector), or a Type-B connector, or a Mini-USB connector, or a Micro-USB connector, or a Type-C connector.

The USB module 60 includes an USB device controller (UDC) 61, for communication with the computer device (host computer) 20, 30; more specifically, UDC 61 can communicate with a chip, device or portion (in general, USB host) in the computer device 20, 30 that acts as USB interface. Such chip, device or portion in the computer device 20, 30 allows the computer device 20, 30 to communicate with the USB module 60.

In FIG. 4C, the USB module 60 has been configured to include two configurations 67, 68. When the eye-tracker 40 and the computer device 20, 30 are connected through respective ports 51, 52, a conventional USB enumeration process starts, in which the computer device gets a device descriptor from the USB module 60. A descriptor is a data structure with a certain format. The USB module 60 informs about its attributes through the device descriptor. In a preferred embodiment, the descriptor comprises a first field (typically one byte) indicating the number of bytes in the descriptor and a second field (typically one byte) indicating the type of descriptor. A USB module also has a device address, which is preferably a 7-bits value. The USB module is assigned a unique device address (usually by the USB host of the computer device to which it is connected). The device descriptor informs also about the device address.

In this embodiment, the device descriptor also reports the presence of one of two configurations 67, 68. The reported configuration is the one selected depending on the operating system of the computer device 20, 30. For example, when the computer device is an IPad, and therefore its operating system is IPadOS, configuration 67 is used. In other cases (other computer devices having different operating systems than IPadOS, such as Windows, Android or Linux), configuration 68 is used. In other words, the operating system of the computer device 20, 30 determines the configuration 67, 68 to be used. Either one configuration or the other one is used. In other words, the type of operating system running in the computer device 20, 30 determines the configuration to be used.

First configuration 67 has two interfaces 671, 672. One interface 671 (first interface) is an interface for LAN over USB, such as Ethernet-style networking over USB, and the other interface 672 (second interface) is a HID (human interface device) interface. In a preferred embodiment, the first interface 671 is in particular an ECM (Ethernet control model) interface, which is the USB Ethernet function for IPadOS. The first interface 671—networking interface-uses one or more endpoints 671A, 671B, 671C. An endpoint is an addressable portion of a USB module from which a communication between a USB host in a computer device and the USB module starts or at which said communication ends. Endpoints in the USB module 60 communicate with a corresponding piece of software located in the computer device 20, 30 through a virtual connection referred to as a pipe. There may be two types of pipes: streams, which refer to unstructured flow; and messages, which refer to structured flow. When the device descriptor reports the presence of an interface, the USB host in the computer device 20, 30 polls the status of the interface via an endpoint. This polling is done at a specific interval, as specified in the device descriptor. Each endpoint is assigned a number, preferably a 4-bits number, which identifies the endpoint. The first interface 671 may alternatively use another protocol for Ethernet-style networking over USB in order to allow application-independent exchange of data with the USB module 60. Non-limiting example of such alternative protocols are EEM (Ethernet Emulation Model), NCM (Network Control Model) and RNDIS (Remote Network Driver Interface Specification). The second interface 672 (HID interface) uses one or more endpoints 672A, 672B, 672C. HID interface 672 is used to detect the operations of human interface devices, such as a mouse, a keypad or other sensor. HID interface 672 is preferably configured to detect the operations of a mouse, in other words, to emulate a mouse. First configuration 671 is preferably used when the operating system of the computer device is IPadOS (i.e. when the computer device is an Pad).

Second configuration 68 has one interface 681. This means that when the second configuration 68 is used, the device descriptor reports the presence of one interface 681 of this configuration 68. This interface 681 is an interface for LAN over USB, such as Ethernet-style networking over USB. In a preferred embodiment, this interface 681 is in particular an RNDIS (Remote Network Driver Interface Specification) interface. RNDIS is a Microsoft proprietary protocol that provides a virtual Ethernet link to most versions of the Windows, Linux, and FreeBSD operating systems. RNDIS is the USB Ethernet function for Windows. Therefore, this interface enables to emulate a networking interface (Ethernet interface) compatible with a variety of operating systems, such as Windows, Android and Linux, that the computer device 20, 30 may implement. This interface 681 may alternatively use another protocol for Ethernet-style networking over USB in order to allow application-independent exchange of data with the USB device 60. Non-limiting example of such alternative protocols are EEM (Ethernet Emulation Model), NCM (Network Control Model) and ECM (Ethernet Control Mode), among others. In this configuration 68 no HID interface is required because the operating system using this configuration (for example Windows, Android or Linux) has access to an API for cursor control. Therefore, there is no need for external mouse emulation (emulation from the eye-tracker). In other words, the operating system has own tools/mechanisms for controlling the mouse.

As shown in FIG. 4C, a different USB driver is required for managing each function in each configuration. For example, in the first configuration 67 there is one driver for the ECM function and another driver for the mouse-HID function. And in the second configuration 68, there is one driver for the RNDIS function.

Thanks to the LAN interface, such as Ethernet interface, implemented in both configurations 67, 68, and to the network generated in this interface, messages can be sent between eye-tracker 40 and computer device 20, 30. This enables sending information coded in a way that can be later read by the different types of hosts, regardless of their operating system.

In any configuration 67, 68, the information transmitted through the mentioned network interfaces is encapsulated in TCP/IP packets or in UDP/IP packets. Information related to calibration and to synchronization is preferably transmitted using TCP, while information related to the gaze point (and other information) is preferably transmitted using UDP.

FIG. 4A shows a schematic representation of an alternative USB module 60 comprised in an eye-tracker 40 according to another embodiment of the invention. The only difference between USB module 60 in FIG. 4A and USB module 60 in FIG. 4C is that in FIG. 4A it only implements one configuration 68. Any other features of module 60 are the ones described with reference to FIG. 4C. In the embodiment illustrated in FIG. 4A, in the enumeration process the device descriptor reports the presence of configuration 68. This configuration is designed to operate with operating systems in the computer device 20, 30 not requiring that a HID interface is implemented in the USB module 60. Non-limiting examples of such operating systems are Windows, Android and Linux. However, one skilled in the art will understand that other operating systems may be developed, or existing operating systems may evolve, in such a way that they have access to for example an API for cursor control. As explained with reference to FIG. 4C, interface 681 is an interface for LAN over USB, such as Ethernet-style networking over USB. The former description of interface 681, referred to FIG. 4C, applies here mutatis mutandis.

FIG. 4B shows a schematic representation of an alternative USB module 60 comprised in an eye-tracker 40 according to another embodiment of the invention. The only difference between USB module 60 in FIG. 4B and USB module 60 in FIG. 4C is that in FIG. 4B it only implements one configuration 67. Any other features of module 60 are the ones described with reference to FIG. 4C. In the embodiment illustrated in FIG. 4B, in the enumeration process the device descriptor reports the presence of configuration 67. This configuration 67 implements two interfaces 671, 672. This configuration is designed to operate with operating systems in the computer device 20, 30 requiring that a HID interface is implemented in the USB module 60, as explained with reference to FIG. 4C. Non-limiting examples of such operating systems is IpadOS (i.e. when the computer device is an IPad). However, one skilled in the art will understand that other operating systems may be developed, or existing operating systems may evolve, in such a way that HID interface is required in the USB device. As explained with reference to FIG. 4C, interface 671 (first interface) is an interface for LAN over USB, such as Ethernet-style networking over USB and interface 672 (second interface) is a HID (human interface device) interface. The former description of interfaces 671, 672, referred to FIG. 4C, applies here mutatis mutandis.

Next, some relevant stages in the communication between a USB module 60 of this embodiment and a USB host 201, 202 in the computer device 20, 30 are explained in detail. One of these stages is the bus enumeration, which happens once the USB module 60 of the eye-tracker is plugged in a USB host of a computer device 20, 30. Another of these stages can be referred to as USB protocol, which starts once the bus enumeration has ended. The mentioned bus is a USB bus (Universal Serial Bus).

When a USB module 60 is plugged in a bus or plugged out of a bus, the USB host in the computer device starts a conventional process called bus enumeration, for identifying and controlling the state of the USB module and therefore of the eye-tracker 40. The bus enumeration process is out of the present invention. When an eye-tracker 40 having a USB module 60 is connected to a computer device, within the enumeration process, the following actions preferably happen, among others: The USB host reads the configuration information of the USB module 60. If there are n configurations, n being a natural number, it reads from configuration 0 to configuration n−1. This is the case, for example, of USB device 60 in FIG. 4C. This may take several milliseconds. Based on the configuration information, the USB host in the computer device assigns a configuration value to the USB module 60. The USB device 60 is now in a "Configured" state with the configuration suitable to the operating system of the computer device, and all the endpoints of this configuration are according to their specific characteristics. From the eye-tracker (and USB module comprised therein) point of view, the eye-tracker is ready for being used, although it may not yet have the energy/power required by the endpoint characteristics.

Once the bus enumeration has ended, the USB protocol is executed. A transaction (exchange of data comprising information of interest) over the bus, between eye-tracker and computer device, can now start. The USB protocol is out of the scope of the present invention. It is remarkable that a transaction starts with the USB host of the computer device sending a packet, referred to as "token packet", indicating transaction type, transaction address, USB device address and transaction endpoint. Next, the transmitting end sends a data packet or informs that it has no packets to transmit. Finally, the receiving end sends a packet indicating that the data packet has been correctly received.

Because module 43 establishes a common language understandable by different operating systems that the computer device 20, 30 may implement, the eye-tracker 40 of the invention does not need specific drivers for different operating systems. As a consequence, the eye-tracker 40 is fully compatible with any computer device 20, 30 to which it may be connected. Through the different configurations 67, 68 already described, the USB module 60 implements a local area network, such as an Ethernet network, by means of a specific interface, in order to establish a communication between the eye-tracker 40 and the computer device 20, 30 by means of sockets (either UDP or TCP). Through this Ethernet network the communication with specific applications in different OS is enabled. The USB module 60 may also implement a USB HID mouse (mouse interface) through the corresponding configuration when the OS of the computer device 20, 30 requires it.

The invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. An eye-tracker comprising:
an imaging system configured to capture a plurality of images of a user's eyes, said images comprising information of the user's point of gaze on a display of a computer device;
a processing module for processing said images captured by the imaging system and providing processed data comprising structured information;
a module configured for converting the processed data comprising structured information into data written in a common language understandable by different operating systems, said data comprising serialized structured information, wherein serialized structured information comprises the processed data in a format understandable by said different operating systems; and
a connection module coupled to an input/output port of the eye-tracker for connecting the eye-tracker with a computer device, wherein the connection module is a USB module coupled to a USB input/output port for connecting the eye-tracker with a computer device through a USB interface, wherein the connection module is designed to implement two different configurations, the selection of one of the two different configurations being determined by the operating system of the computer device,
wherein one of the two different configurations is selected when the operating system of the computer device is IPadOS and the other one of the two different configurations is selected when the operating system of the computer device is an operating system different from IPadOS.

2. The eye-tracker of claim 1, wherein said structured information comprises at least the following information: gaze points; eyes position on the image; and distance between the user and the eye-tracker.

3. The eye-tracker of claim 1, wherein at least one configuration of the two different configurations implements a local area network (LAN) over USB interface.

4. The eye-tracker of claim 3, wherein the at least one configuration is configured to establish different types of communication between the eye-tracker and the computer device for enabling the following: sending video signals to the computer device; mouse control by sending the position or coordinates of the mouse cursor on the display; calibration of the eye-tracker; power charging of the eye-tracker; software upgrades in the computer device; or collecting statistics of use of the eye-tracker from the computer device and sending statistics of use of the eye-tracker to the eye-tracker.

5. The eye-tracker of claim 3, wherein the at least one configuration is a configuration further implementing a HID USB mouse interface.

6. The eye-tracker of claim 3, wherein said local area network (LAN) over USB interface is an Ethernet USB network interface.

7. The eye-tracker of claim 6, wherein said interface is an ECM (Ethernet control model) interface or a RNDIS (Remote Network Driver Interface Specification) interface.

8. A system comprising an eye-tracker according to claim 1 and a computer device connected to the eye-tracker through a USB interface, wherein a cursor on the display of the computer device is controllable from a point of gaze of a user on the display obtained by the eye-tracker.

9. The system of claim 8, wherein the computer device is selected from a group of computer devices consisting of: a personal computer, a laptop, a tablet, a smartphone and a smart TV.

10. The system of claim 8, wherein the computer device implements an operating system selected from a group of operating systems consisting of: Windows, iOS, IpadOS, Android and GNU/Linux.

11. The system of claim 8, wherein the computer device has an embedded software application configured to interpret the serialized structured information provided by the eye-tracker.

12. A method for communication between an eye-tracker and a computer device, wherein the eye-tracker comprises an imaging system configured to capture images of a user's eyes, said images comprising information of the user's point of gaze on a display of the computer device; a processing module for processing the images captured by the imaging system and providing processed data comprising structured information; a module for converting the processed data comprising structured information into data written in a common language understandable by different operating systems, said data comprising serialized structured information, wherein serialized structured information comprises the processed data in a format understandable by said different operating systems; and a connection module coupled to an input/output port for connecting the eye-tracker with the computer device, wherein the connection module is a USB module coupled to a USB input/output port for connecting the eye-tracker with a computer device through a USB interface, wherein the connection module is designed to implement two different configurations, the selection of one of the two different configurations being determined by the operating system of the computer device, wherein one of the two different configurations is selected when the operating system of the computer device is IPadOS and the other one of the two different configurations is selected when the operating system of the computer device is an operating system different from IPadOS; the method including the following steps:
reading at a USB host of the computer device configuration information of the USB module, said configuration information comprising information of at least one configuration, said at least one configuration implementing a local area network (LAN) over USB interface, and
starting a communication following the USB protocol between said USB host and said USB module.

13. A non-transitory computer program product, the computer program product comprising computer program instructions/code for performing the method of claim 12.

14. A non-transitory computer-readable memory/medium, the computer-readable memory-medium stores program instructions/code for performing the method of claim 12.

* * * * *